United States Patent
Dickerson et al.

(10) Patent No.: US 9,865,305 B2
(45) Date of Patent: Jan. 9, 2018

(54) SYSTEM AND METHOD FOR INTERACTIVE 360-DEGREE VIDEO CREATION

(71) Applicant: Samsung Electronics Co., Ltd, Suwon-si (KR)

(72) Inventors: Andrew J. Dickerson, Allen, TX (US); Tom Min-Tien Chen, Dallas, TX (US); Jeff Wilkinson, Flower Mound, TX (US); Lam Nguyen, Garland, TX (US)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/236,270

(22) Filed: Aug. 12, 2016

(65) Prior Publication Data

US 2017/0053675 A1     Feb. 23, 2017

Related U.S. Application Data

(60) Provisional application No. 62/208,311, filed on Aug. 21, 2015.

(51) Int. Cl.
| | |
|---|---|
| H04N 9/80 | (2006.01) |
| G11B 27/10 | (2006.01) |
| G11B 27/031 | (2006.01) |
| G11B 27/34 | (2006.01) |
| G11B 27/036 | (2006.01) |

(52) U.S. Cl.
CPC .......... *G11B 27/102* (2013.01); *G11B 27/031* (2013.01); *G11B 27/036* (2013.01); *G11B 27/34* (2013.01)

(58) Field of Classification Search
CPC ..... G11B 27/102; G11B 27/031; G11B 27/34; G11B 27/036
USPC ................ 386/241, 239, 242, 248, 278, 326
See application file for complete search history.

(56) References Cited

U.S. PATENT DOCUMENTS

| | | | |
|---|---|---|---|
| 6,563,529 B1 | 5/2003 | Jongerius | |
| 6,795,113 B1 | 9/2004 | Jackson et al. | |
| 8,745,657 B2 | 6/2014 | Chalozin et al. | |
| 8,762,890 B2 | 6/2014 | Falchuk et al. | |
| 9,036,043 B2 | 5/2015 | Segal | |
| 2003/0223468 A1* | 12/2003 | Koga | H04N 5/23238 370/537 |
| 2004/0194017 A1 | 9/2004 | Cosic | |
| 2008/0033641 A1 | 2/2008 | Medalia | |
| 2012/0120200 A1 | 5/2012 | Newton et al. | |
| 2013/0120544 A1 | 5/2013 | Du et al. | |
| 2013/0330055 A1 | 12/2013 | Zimmermann et al. | |
| 2014/0026048 A1 | 1/2014 | Spirer | |
| 2014/0063061 A1* | 3/2014 | Reitan | G09G 3/003 345/633 |
| 2014/0098185 A1 | 4/2014 | Davari et al. | |

(Continued)

*Primary Examiner* — Robert Chevalier

(57) ABSTRACT

A method is provided for creating a single interactive video file. The method includes receiving a selection of a plurality of 360-degree videos including a first 360-degree video and a second 360-degree video. The method also includes linking the first 360-degree video to the second 360-degree video to enable transitioning between the first 360-degree video and the second 360-degree video. The method also includes compiling the plurality of 360-degree videos into the single interactive file. The single interactive video file includes an index used to identify the second 360-degree video within the single interactive video file when the link is executed.

20 Claims, 9 Drawing Sheets

(56) References Cited

U.S. PATENT DOCUMENTS

2014/0282724 A1  9/2014  Chalozin et al.
2015/0062118 A1  3/2015  Ebner et al.
2015/0143239 A1  5/2015  Birkbeck et al.

* cited by examiner

SYSTEM AND METHOD FOR INTERACTIVE 360-DEGREE VIDEO CREATION

CROSS-REFERENCE TO RELATED APPLICATION(S) AND CLAIM OF PRIORITY

This application claims priority under 35 U.S.C. §119(e) to U.S. Provisional Patent Application No. 62/208,311 filed on Aug. 21, 2015, entitled "INTERACTIVE 360 VIDEO PROCESS." The content of the above-identified patent document is incorporated herein by reference.

TECHNICAL FIELD

This disclosure relates generally to video creation. More specifically, this disclosure relates to a system and method for interactive 360-video creation.

BACKGROUND

In virtual reality headsets there is a new medium of video that is very popular, 360-degree video. Now that resolutions and processing power is increasing, 360-degree video experiences are more prevalent. When watching a 360 video though, the user feels immersed, but is unable to interact with the scene.

SUMMARY

Embodiments of the present disclosure a system and method for interactive 360-video creation.

In one example embodiment, a method is provided for creating a single interactive video file. The method includes receiving a selection of a plurality of 360-degree videos including a first 360-degree video and a second 360-degree video. The method also includes link the first 360-degree video to the second 360-degree video to enable transitioning between the first 360-degree video and the second 360-degree video. The method also includes compiling the plurality of 360-degree videos into the single interactive file. The single interactive video file includes an index used to identify the second 360-degree video within the single interactive video file when the link is executed.

In another example embodiment, an apparatus is provided for creating a single interactive video file. The apparatus includes a memory element configured to store the single interactive video file. The apparatus also includes at least one processor coupled to the memory element. The processor is configured to receive a selection of a plurality of 360-degree videos including a first 360-degree video and a second 360-degree video. The processor is also configured to link the first 360-degree video to the second 360-degree video to enable transitioning between the first 360-degree video and the second 360-degree video. The processor is also configured to compile the plurality of 360-degree videos into the single interactive file. The single interactive video file includes an index used to identify the second 360-degree video within the single interactive video file when the link is executed.

In yet another example embodiment, a non-transitory computer-readable medium is provided. The computer-readable medium comprises program code for creating a single interactive video file. The program code, when executed by at least one processor, causes the electronic device to receive a selection of a plurality of 360-degree videos including a first 360-degree video and a second 360-degree video. The program code, when executed by at least one processor, also causes the electronic device to linking the first 360-degree video to the second 360-degree video to enable transitioning between the first 360-degree video and the second 360-degree video. The program code, when executed by at least one processor, also causes the electronic device to compile the plurality of 360-degree videos into the single interactive file. The single interactive video file includes an index used to identify the second 360-degree video within the single interactive video file when the link is executed.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
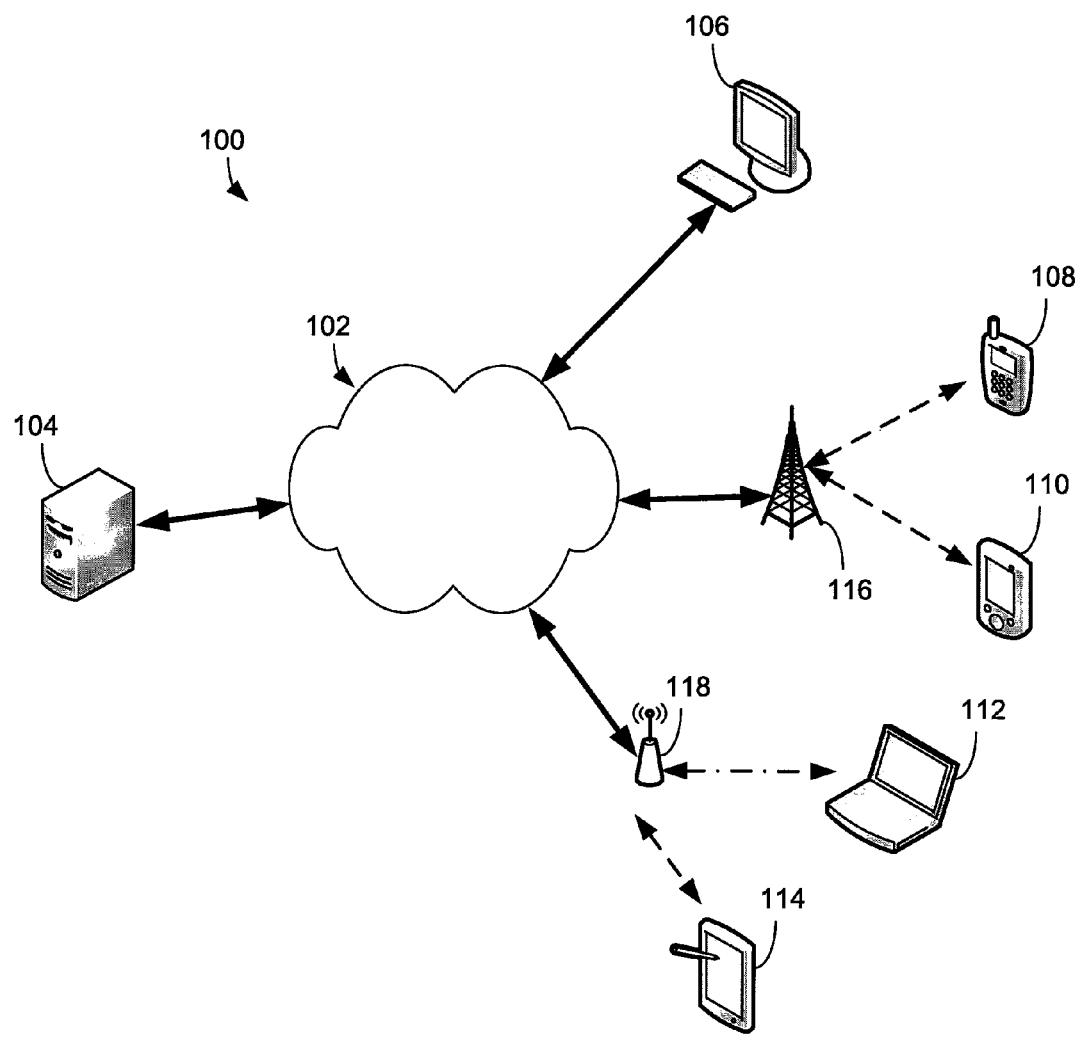
FIG. 1 illustrates an example computing system in which one or more embodiments of the present disclosure may be implemented.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, one or more of the client devices 108-114 can access a video editing tool on a server 104 to compile multiple videos into a single interactive video file. The videos can be located on the client devices 108-114 and uploaded to the server 104 for editing, the videos may already be stored on the server 104, or a combination thereof. In a different example embodiment, the video editing tool can be located on one of the client devices 108-114. In yet other embodiments, multiple client devices 108-114 can jointly access the server 104 to add videos for compiling into the single interactive video.

An embodiment of this disclosure provides for the single interactive video file to be stored on the server 104, or another server, and accessed by one of the client devices 108-114 for playing by a video player. In another embodiment, the single interactive video file can be downloaded and stored on the client device.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
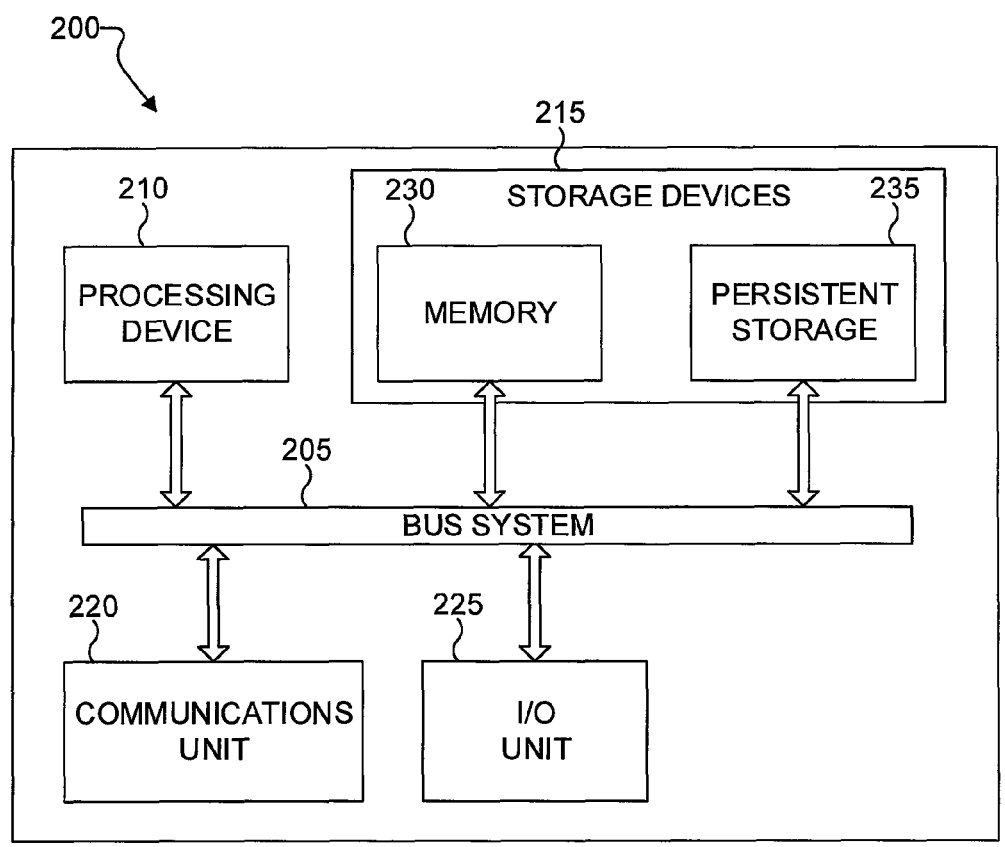
FIGS. 2 and 3 illustrate example devices in a computing system in which one or more embodiments of the present disclosure may be implemented.
Figure 3:
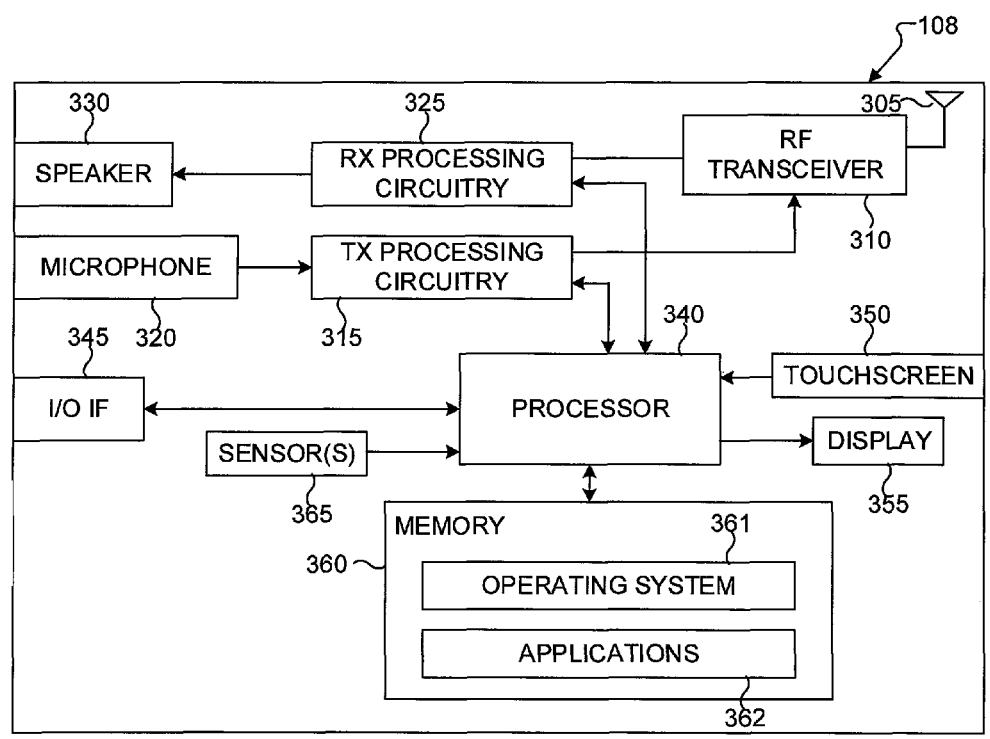

FIGS. 2 and 3 illustrate example devices in a computing system according to this disclosure. In particular, FIG. 2 illustrates an example server 200, and FIG. 3 illustrates an example UE 300. The server 200 could represent the server 104 in FIG. 1, and the UE 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2. In one or more embodiments, when the server 104 is a laptop or desktop computer, the video editing tool may exist on the computer for use by a user in compiling one or more videos. The compiled single interactive video file can then later be uploaded to another server, client device, and/or computer.

As described in more detail below, embodiments of the present disclosure provide a tool set that allows users to create a project and upload a 360-degree video or multiple 360-degree videos to a project, and then define hotspots overlaid on the 360-degree videos as points of action or interaction. In one example, the tool is web based and located on server 200. In another example, the tool is a downloadable application for a computer, such as when server 200 is used as the desktop computer 106 or laptop computer 112, or mobile telephone or smartphone 108.

FIG. 3 illustrates user equipment (UE) 300 in which one or more embodiments of the present disclosure may be implemented. The embodiment of the UE 300 illustrated in FIG. 3 is for illustration only, the UE 300 comes in a wide variety of configurations, and FIG. 3 does not limit the scope of this disclosure to any particular implementation of a UE.

In various embodiments, the UE 300 may take different forms, and the present disclosure is not limited to any particular form. For example, the UE 300 may be a mobile communication device, such as, for example, a mobile station, head mountable display, a subscriber station, a wireless terminal, a smart phone, a tablet, etc., that is useable with 360-degree video, virtual reality (VR), and/or augmented reality (AR) applications. In other examples, the UE 300 may include a headset and take the form of a wearable electronic device, such as, for example, glasses, goggles, a helmet, etc., for the VR and/or AR applications.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a processor 340, an input/output (I/O) interface (IF) 345, a touchscreen 350, a display 355, a memory 360, and one or more sensors 365. The memory 360 includes an operating system (OS) 361 and one or more applications 362.

The RF transceiver 310 receives, from the antenna 305, an incoming RF signal transmitted by an access point (e.g., base station, Wi-Fi router, Bluetooth device) for a network (e.g., a Wi-Fi, Bluetooth, cellular, 5G, LTE, LTE-A, WiMAX, or any other type of wireless network). The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 300 with the ability to connect to other devices, such as laptop computers and handheld computers. The I/O interface 345 is the communication path between these accessories and the processor 340.

The processor 340 is also coupled to the touchscreen 350 and the display 355. The operator of the UE 300 can use the touchscreen 350 to enter data and/or inputs into the UE 300. The display 355 may be a liquid crystal display, light-emitting diode (LED) display, optical LED (OLED), active matrix OLED (AMOLED), or other display capable of rendering text and/or graphics, such as from websites, videos, games, etc.

The memory 360 is coupled to the processor 340. Part of the memory 360 could include a random access memory (RAM), and another part of the memory 360 could include a Flash memory or other read-only memory (ROM).

UE 300 further includes one or more sensors 365 that can meter a physical quantity or detect an activation state of the UE 300 and convert metered or detected information into an electrical signal. For example, sensor 365 may include one or more buttons for touch input, e.g., on the headset or the UE 300, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 365 can further include a control circuit for controlling at least one of the sensors included therein. The sensor(s) 365 can be used to determine an orientation and facing direction of the UE for 360-degree video. Any of these sensor(s) 365 may be located within the UE 300, within a headset configured to hold the UE 300, or in both the headset and UE 300, for example, in embodiments where the UE 300 includes a headset.

The touchscreen 350 can include a touch panel, a (digital) pen sensor, a key, or an ultrasonic input device. The touchscreen 350 can recognize, for example, a touch input in at least one scheme among a capacitive scheme, a pressure sensitive scheme, an infrared scheme, or an ultrasonic scheme. The touchscreen 350 can also include a control circuit. In the capacitive scheme, the touchscreen 350 can recognize touch or proximity. As described in more detail below, the UE may include circuitry for and applications for editing or playing a 360-degree video. Although FIG. 3 illustrates one example of UE 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 300 configured as a mobile telephone, tablet, or smartphone, the UE 300 could be configured to operate as other types of mobile or stationary devices.

As described in more detail below, the UE 300 can be one example of any of client devices 108-114 for the use of playing a single interactive video file or editing multiple videos to compile to the single interactive video file. The UE 300 can be used to remotely edit or access an editing tool on a server, such as server 104 of FIG. 1 or server 200 of FIG. 2. Additionally, the UE 300 can be used to play a single interactive video file comprising multiple 360-degree videos that include interactive features, such as hotspots.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 300 configured as a mobile telephone or smartphone, client devices could be configured to operate as other types of mobile or stationary devices. In addition, as with computing and communication networks, UEs and servers can come in a wide variety of configurations, and FIGS. 2 and 3 do not limit this disclosure to any particular UE or server.

Figure 4:
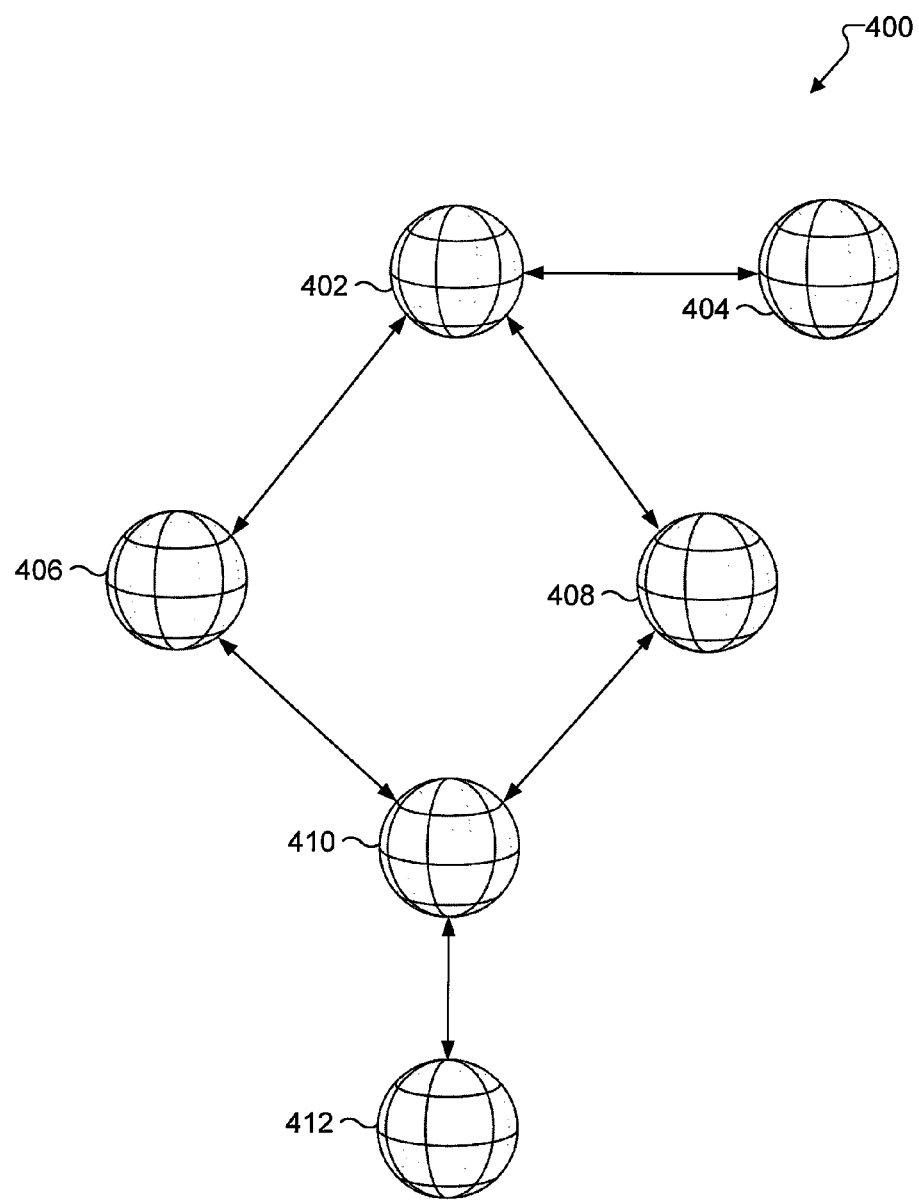
FIG. 4 illustrates a mapping for a plurality of 360-degree videos in accordance with an embodiment of this disclosure.

FIG. 4 illustrates a mapping 400 for a plurality of 360-degree videos in accordance with an embodiment of this disclosure. The embodiment of the mapping 400 illustrated in FIG. 4 is for illustration only. Mappings for a plurality of 360-degree videos can come in a wide variety of configurations, and FIG. 4 does not limit the scope of this disclosure to any particular implementation of a mapping.

In FIG. 4, the spheres represent 360-degree videos 402-412. Each of the 360-degree videos 402-412 can include a plurality of portions of video that when combined, create the 360-degree video. Each 360-degree video includes horizontal and vertical lines for illustration purposes to show the stitching of the different portions of the 360-degree video. In different embodiments, the stitching can be done in a different manner, such as different size and shapes as those indicated in FIG. 4. In yet further embodiments, the 360-degree video may be a single video, rather than multiple stitched video portions. Additionally, as discussed herein, a 360-degree video can include a full video, a segment or clip or a video, any other user defined video length or portion of a video. Also, as discussed herein, a 360-degree video can be a video file containing the data used to create the 360-degree video in a video player.

In an embodiment of this disclosure, a UE 300 can be illustratively positioned at the center of a 360-degree video. When using the UE 300 in a hand-held manner, portions of the 360-degree video can be displayed in the UE 300 and the user can cause movement of the 360-degree video to show different portions of the 360-degree video.

Each video 402-412 can be linked to one or more of the other videos 402-412. For example, as shown in FIG. 4, video 402 is linked to videos 404-408, videos 406-408 are further linked to video 410, and video 410 is further linked to video 412. Each video can transition to any linked videos. A transition can be referred to a jump, or jumping from one video to another. The transition can be direct and can also include special effects such as, but not limited to, fading. When a transition occurs, the video player replaces the currently playing video with the transitioned to video.

In some embodiments, one or more links can be bi-directional. That is, the videos on each end of the link can transition to each other. For example, if the link between videos 402 and 404 is bi-directional, then the video player can transition from video 402 to 404, and vice versa. Additionally, some links can be unidirectional. That is, the transition can only occur in one direction between linked videos. For example, if the link between videos 410 and 412 is unidirectional in the direction of video 412, then the transition can only occur from video 410 to video 412. In different embodiments, different triggers can cause a transition. For example, the trigger can be a hotspot, the end of a video, a period of inactivity, etc.

The different videos in the single interactive video file may be defined by a user through a user interface (UI) by adding and arranging the different videos, clips, or segments in a desired order or arrangement. The videos may then be linked or connected with each other and with child-segments as required by the single interactive video file.

Each video is composed of a video clip or segment and a list of links that can potentially be triggered through respective hotspots. When triggered, the links advance the story (i.e., currently played video) to the target video or take a side-quest through a vignette.

In FIG. 4, if the video 402 is a starting point for the video, then video 404 is a child-segment of video 402. In this case, because video 404 is not linked to any other videos, video 404 is a vignette. As used herein, segments and vignettes may be examples of videos. Vignettes, once played, always return to the parent-segment, and no additional links exists within a vignette. In this example, video 406 is also a child-segment of video 402, but is not a vignette because video 406 is further linked to, and a parent-segment of, video 410. Video 410 is a child-segment of video 406. Segments can be used to indicate any other video that is not a vignette, such as videos that include multiple paths to different other videos.

FIG. 4 provides a hierarchy of segments and vignettes and assigns an index to each video associated to the videos (e.g., segment or vignette). The order of traversal is based on the video ordering as the user created the videos and does not reflect the order of the videos as they will be viewed in the story, except for the first video. In one example embodiment, during video traversal, each segment and all the vignettes associated with that segment can be processed before moving on to the next segment and its vignettes. This ordering of segments and vignettes is also used as the serialization order for concatenating all the video clips into one. As the process traverses the segments and vignettes, the duration of each video is added to a counter, and the counter is used to calculate the start and end times of the clips as they will appear in the concatenated video.

The result of the data compilation into the single interactive video file may be an ordered array of start and end time offsets that represent the video locations that will be in the single interactive video file. Additionally, each element of the array also contains a list of links, each with a list of hotspots that can be activated by the user, and the index of the target segment or vignette to seek to when the links are actually activated. Several additional optional fields can indicate to the client how to behave when transitioning between video clips or when returning from a vignette to the parent segment (such as preserving orientation.).

Although FIG. 4 illustrates an example video hierarchy, various changes may be made to FIG. 4. For example, different videos could be combined, further subdivided, or omitted and additional videos could be added according to particular needs. As a particular example, video 412 may loop back to video 402.

Figure 5:
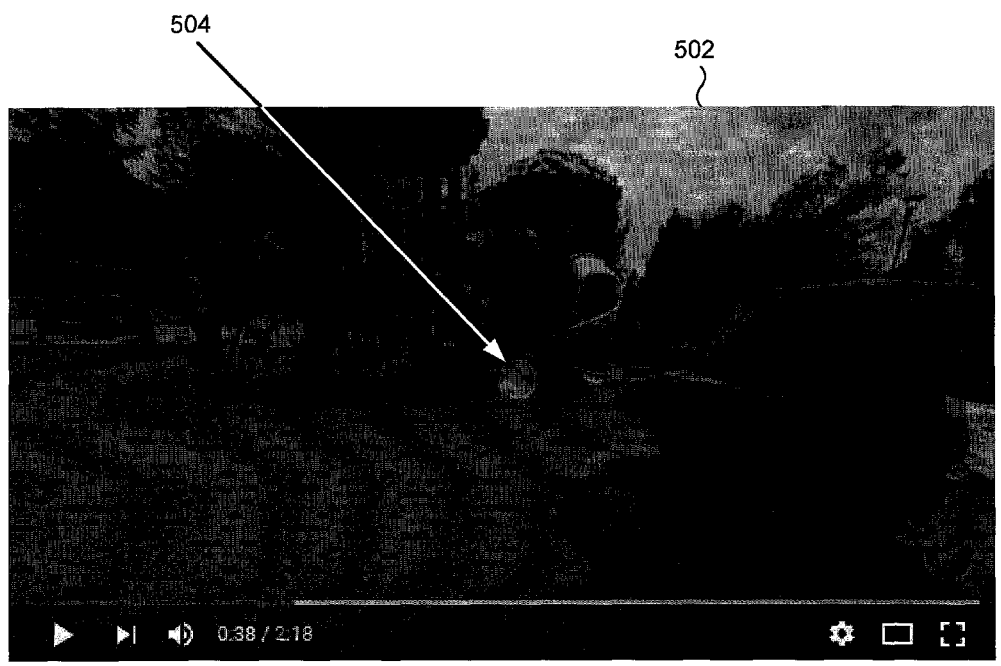
FIG. 5 illustrates a portion of a 360-degree video with a hotspot 504 in accordance with an embodiment of this disclosure.

FIG. 5 illustrates a portion 502 of a 360-degree video with a hotspot 504 in accordance with an embodiment of this disclosure. In FIG. 5, in an embodiment of this disclosure, a display of a UE can display or render only a portion 502 of a 360-degree video. This portion is based on the viewing angle, which can be set based on a size of a display or video content. In one embodiment of this disclosure, portion 502 includes hotspot 504. The hotspot 504 can be any graphic or icon that identifies a hotspot. In one embodiment, the hotspot is overlaid over an area related to the hotspot. For example, the hotspot 504 in FIG. 5 is overlaid over an underneath opening of a playground. This opening is related to the hotspot because the hotspot takes a user to a new video showing the underneath portion of the playground. In other embodiments, the hotspot could be to the side of the area related to the hotspot, such as when the hotspot is an arrow, or elsewhere in the video.

In different embodiments, the hotspot shape can be spherical, rectangular, square, custom, based on an outline of an object within the 360-degree video, etc. The hotspot 504 can cause seamless jumping to a next scene of a video, playing audio when a user looks at a particular object or direction in the scene, or informational media overlays when the user looks certain directions. The hotspot can be triggered by a user selection, a user focusing on the hotspot for a period of time, as a reaction to another event, etc. Although FIG. 5 illustrates an example hotspot, various changes may be made to FIG. 5. For example, additional hotspots can be include, or no hotspots.

One or more embodiments of this disclosure recognize and take into account that a photo tour can include only static 360-degree photos (i.e., no video). One or more embodiments of this disclosure provide a system that uses video and is able to switch between several different types of 360-degree videos rapidly by selecting or looking at hotspots in the video.

Additionally, in one or more embodiments, a 360-degree interactive video-editing tool can be web based to allow for creation of a project that includes 360-degree video clips or entire 360-degree videos. Various embodiments of this disclosure provide the ability to specify hotspots, transitions, vignettes, overlays, different events, video synchronization options, 360-degree audio, orientation options, time offsets, all while editing the content from inside of the 360 videos.

The embodiments of this disclosure provide a solution for creation of an interactive video. A user of the solution can set a hotspot using user interfaces. The solution may utilize a video editing tool allowing compilation of the videos and hotspots into one package. The package may use a format allowing quick switching between transitions and can combine multiple videos into a single video with timestamps and additional data.

Figure 6:
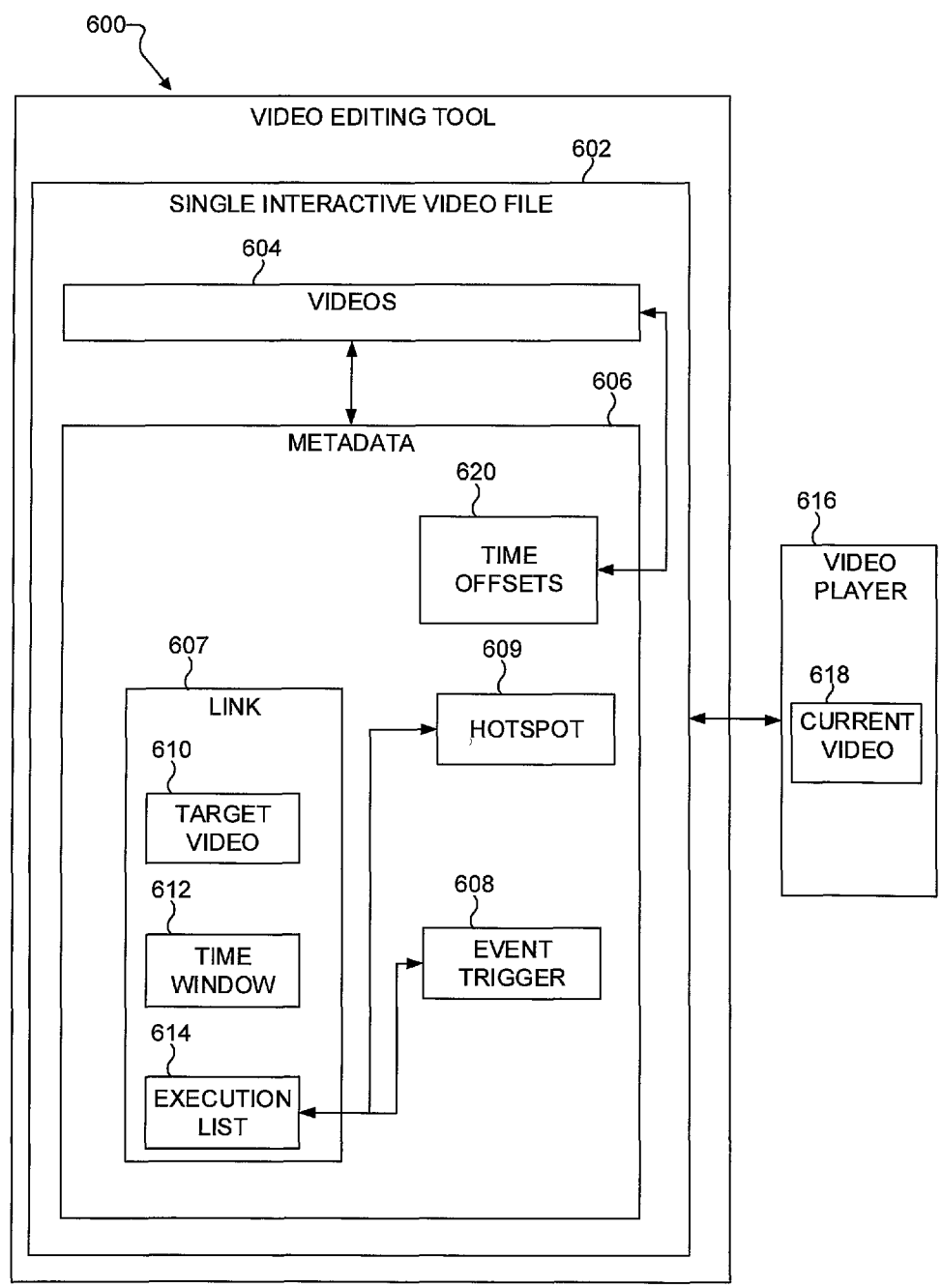
FIG. 6 illustrates a single interactive video file compiled from a plurality of 360-degree videos in accordance with an embodiment of this disclosure.

FIG. 6 illustrates an exemplary video-editing tool 600 used to compile a single interactive video file 602 from 360-degree videos 604 in accordance with an embodiment of this disclosure. The video-editing tool 600 illustrated in FIG. 6 is for illustration only. Video-editing tool 600 can come in a wide variety of configurations, and FIG. 6 does not limit the scope of this disclosure to any particular implementation of a video-editing tool.

In FIG. 6, the video-editing tool 600 can be located on server 200 or UE 300. The video-editing tool 600 can be used to define metadata 606 within the single interactive video file 602. The metadata 606 can include a link 607, hotspot 609, and event trigger 608 in the single interactive video file 602. The link 607 is an association between two or more videos, that when executed, allows a transition between two videos. For example, a link 607 can bridge videos 402 and 404 as shown in FIG. 4. The hotspot 609 is an area, portion and/or object of a video that can be selected or activated in order to execute the link 607. For example, the hotspot 609 can be hotspot 504 as shown in FIG. 5. The event trigger is an event that can occur that can also execute the link 607. For example, the event trigger 608 could include a voice command, an ending of a video, an elapsed period of time, a period of inactivity, etc.

Each link 607 includes a target video 610, an execution list of hotspots and even triggers, and a time window 612 in which the link 607 can be activated. Additional information can also be included that can alter the behavior of the video file 602 in different ways. The link 607 also includes an execution list 614 to identify which hotspots and event triggers are associated with the link 607. When the link 607 is selected, whether though activation of a hotspot 609 or triggering of an event trigger 608, a video player 616 transitions from the currently playing video 618 to the target video 610.

In some embodiments, the hotspot 609 can be associated with multiple links that operate during different time windows. For example, a hotspot over a door may take you into a video for a room behind the door. If triggered during a first time window or range, the video of the room may be different than if triggered during a second time window.

When a hotspot 609 is triggered the video player jumps to a vignette, while an offset 620 may start running. When the vignette ends, the video player returns to the main video with a time offset corresponding to the time viewing the vignette. Using the offsets 620 provides for the perception that the main video has been running while the vignette has been playing. The offsets 620 can be based on the duration of the vignettes. Alternatively, the main video could pause while viewing the vignette. In yet another embodiment, the main video can utilize a time offset so when a hotspot is triggered, an offset will be added to the start time providing for a perception that the main video and vignette were running concurrently.

The video-editing tool 600 can also be used to compile the videos 604 into a single interactive video file 602 that can be streamed, downloaded, and played on the video player 616 capable of playing 360-degree videos. The video player 616 can use the hotspot 609 or event trigger 608 to trigger actions, such as, but not limited to, jumping to another video seamlessly, playing additional audio tracks, image overlays, text overlays, transitions, control panels, etc. The compiling of the videos 604 can be done client side or on the server side, or even once the data arrives to the video player 616.

In one embodiment, all of the videos 604 in an interactive web based project and the metadata 606 that the user created by using the tool 600 are compiled into a package, such as single interactive video file 602, that can be streamed or downloaded and played back by the 360-degree video player 616. The user can then interact and seamlessly jump or transition using hotspots in the videos 604.

In one or more embodiments of this disclosure, the videos 604 can continue playing and even looping while the user chooses which hotspot to look at and/or select. Because of the continuous play, a user senses immersion into the video, allowing seamless video transition experiences to be constructed.

In one or more embodiments, time may elapse in one or more videos, within the single interactive video file 602, that the user has left while they are watching a specific video in the sequence. In other example embodiments, the videos not currently being watched may pause while waiting for a user to return. Various embodiments of this disclosure simplify the process of video editing for a content creator. A content creator can use a web-based or downloaded application/tool to draw hotspots, set transitions, etc. without having to code the metadata 606 or work with video compiling and transcoding.

In one embodiment, the result of the data compilation into the single interactive video file 602 is a single video that includes all of the videos (segments and vignettes) ordered one after another. An ordered array can be included in the metadata 606 of start and end times that represent the video locations of each of the videos 604 within the single video. In this example, the video player may only load the single video in order to load all of the segments and vignettes.

Although FIG. 6 illustrates an example video editing tool, various changes may be made to FIG. 6. For example, the single interactive video file 602 can be sent to the video player 616, or in another example, the file 602 can be accessed remotely from a server. In another example, the configuration of the metadata 606 could include other information about the videos. In yet another example, the link 607 may also include the actual hotspots or event triggers.

Figure 7:
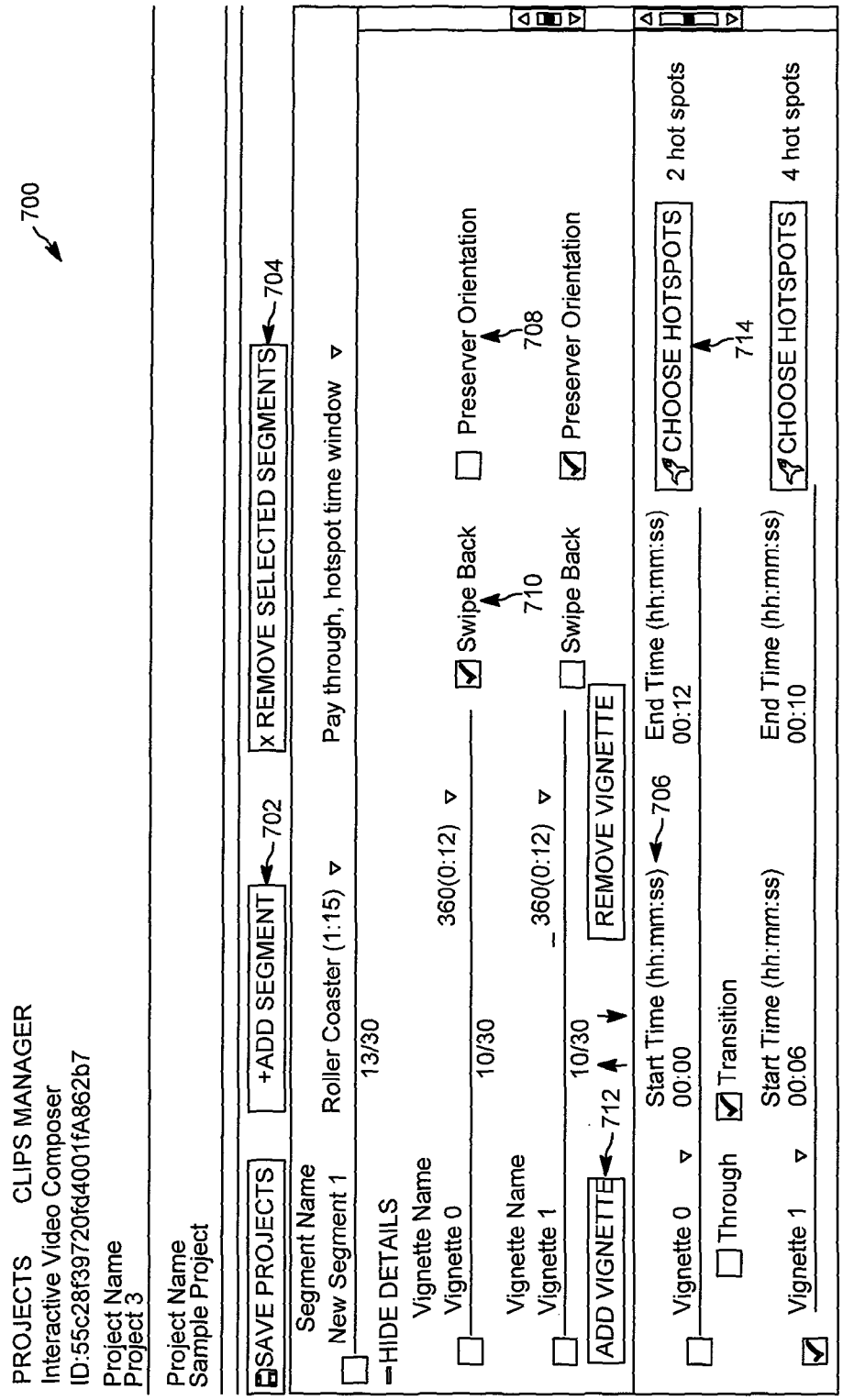
FIG. 7 illustrates a pictorial representation of a video-editing tool in accordance with an embodiment of this disclosure.

FIG. 7 illustrates a pictorial representation of a video-editing tool 700 in accordance with an embodiment of this disclosure. Video-editing tool 700 can be one example of video-editing tool 600 as shown in FIG. 6. Video-editing tool 700 includes adding segments 702 (i.e., videos), removing segments 704, setting hotspot time window 706, adjusting orientation 708, allowing an option to swipe 710 to go back to a prior segment, adding a vignette 712 to any of the segments, selecting hotspots 714, etc.

The video-editing tool 700 can provide a project that includes the ability to add or remove segments to a video. Each segment can be its own video or a clip of a video. FIG. 7 represents a screenshot of the video-editing tool 700 at a particular moment of the video creation process. For example, in FIG. 7, New Segment 1 is currently being edited. New Segment 1 includes Vignettes 0 and 1. Each of the vignettes can be selected to preserve an orientation through box 708 and allow the option to swipe out of the vignette through box 710. Additional vignettes can be added through button 712.

New Segment 1 can include hotspots, that when activated, trigger different vignettes 0 or 1. These hotspots can be selected through button 714. The hotspots for the vignettes can be shown on the New Segment 1 during the specified time window 706. Each of the vignettes can include an option for transitioning or play through. When the transitioning box is selected, the vignette automatically transitions back to the New Segment 1 main video when the vignette is finished. When the "through" box is selected, the vignette plays through and continues to loop.

Although FIG. 7 illustrates an example screenshot of a video-editing tool 700, various changes may be made to FIG. 7. For example, check boxes could be drop down boxes or other types of selection types. In another example, the hierarchy for segments and vignettes can be presented in a different manner.

Figure 8:
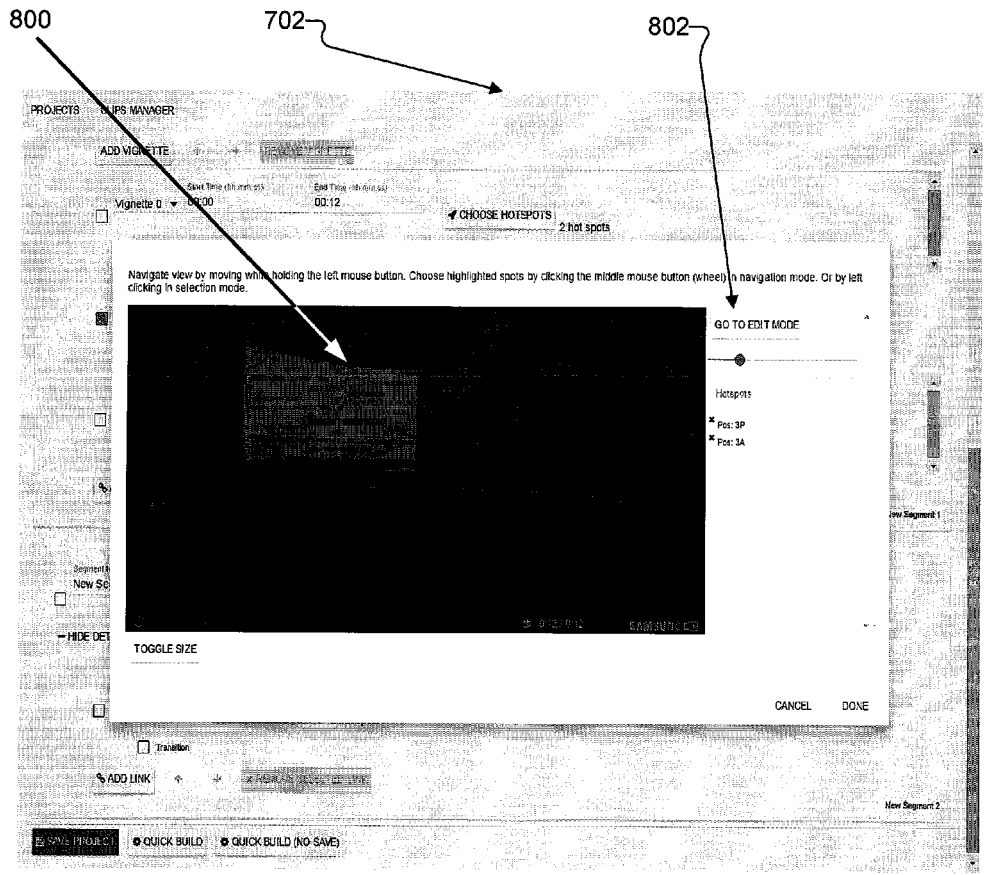
FIG. 8 illustrates a pictorial representation of selecting hotspots in video-editing tool 700 in accordance with an embodiment of this disclosure.

FIG. 8 illustrates a pictorial representation of selecting hotspots 800 in video-editing tool 700 in accordance with an embodiment of this disclosure. When button 714 is selected as shown in FIG. 7, the video-editing tool 700 can include a visual user interface that shows the main 360-degree video of New Segment 1. Different hotspots can be identified through user selection of various points of interaction or triggering. The hotspots may show up on an overlay of the video. The button 802 can be selected to enter an edit mode to add, delete, or otherwise modify the hotspot. In one embodiment, multiple hotspots can be added in the edit mode. In this embodiment, the hotspots added for each vignette can be added separately.

Once hotspot locations are identified, further details can be determined through a composer aspect of the interface. Once all the hotspots are determined, all the information, including additional video clips, metadata, hotspot locations, etc. may be submitted to a compiler. The compiler may be either on the client device or on a server.

Although FIG. 8 illustrates an example pictorial representation of selecting hotspots 800 in video-editing tool 700, various changes may be made to FIG. 8. For example, there may be an additional selection box to switch between vignettes in order to edit hotspots from multiple vignettes without exiting this specific dialog.

Figure 9:
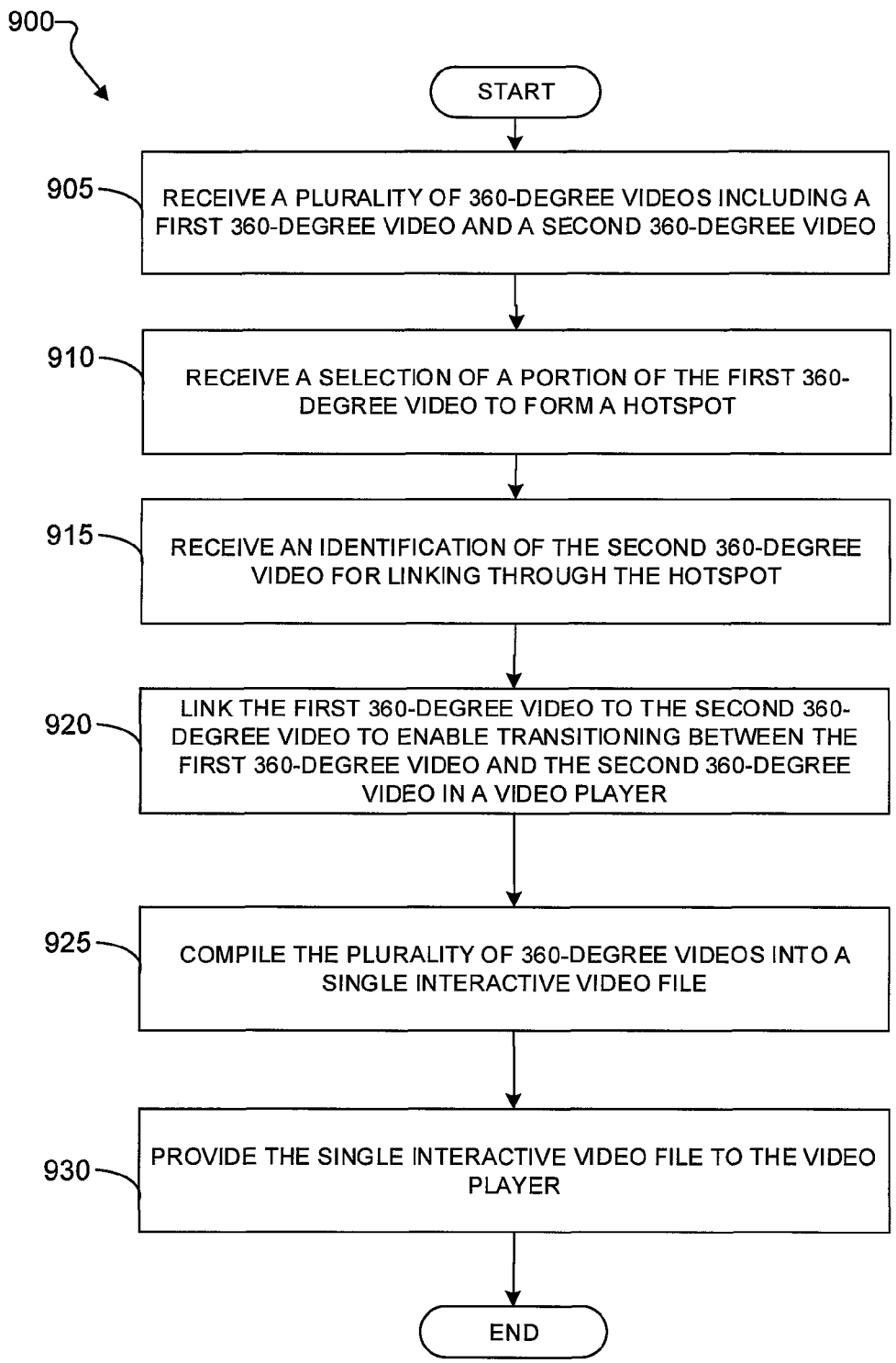
FIG. 9 illustrates a process for creating a single interactive video file according to embodiments of the present disclosure.

FIG. 9 illustrates a process 900 for creating a single interactive video file according to embodiments of the present disclosure. The process 900 depicted in FIG. 9 may be performed by the UE 300 or different components of the UE 300 in FIG. 3, or the server 200 or different components of server 200 in FIG. 2.

At step 905, the process 900 begins with the server 200 receiving a selection of a plurality of 360-degree videos including a first 360-degree video and a second 360-degree video. In different embodiments, the videos can be uploaded from a UE or client device, retrieved from a website, created within the video editing tool of the server 200, etc. While only first and second video are referenced here, additional videos may exist within the plurality of 360-degree videos. In one or more example embodiments, not all of the videos may be 360-degree videos and some of the videos may be traditional videos where all of the content is viewable at one time in a device.

At step 910, the server 200 can receive a selection of a portion of the first 360-degree video to form a hotspot. In one embodiment, the portion can be selected by a user. In another embodiment, the server 200 can select the portion based on video information. In this embodiment, the server 200 can identify an object in the video and automatically create a hotspot. At step 915, the server 200 can receive an identification of the second 360-degree video for linking through the hotspot. In one embodiment, the portion can be selected by a user. In another embodiment, the server 200 can select the portion based on video information.

At step 920, the server 200 can link the first 360-degree video to the second 360-degree video to enable transitioning between the first 360-degree video and the second 360-degree video. Based on the selections and identification of the videos and hotspots in steps 910 and 915, the server 200 can create a link. When creating a link, the server 200 includes metadata to include in a single interactive video file that indicates the two linked videos, the linking activity (hotspot, event triggers, etc.), and any other relevant information (time window, offsets, etc.). The transitioning can occur in different manners. For example, in one embodiment, the transition can replace a portion of the first video with a new portion. In another example, the entire first video is replaced with the second vide.

At step 925, the server 200 can compile the plurality of 360-degree videos into the single interactive file. The single interactive video file includes an index used to identify the second 360-degree video within the single interactive video file when the link is executed. The metadata information based on the information from step 920 can be included into the video file to identify the second video for the link. In this manner, the video file includes all used videos and metadata to link different videos.

During steps 910-925, the server 200 can obtain the videos, concatenate the videos in the right order, and transcode the file. The data compilation produces a list of videos and the order in which the videos can be compiled. If any segments contain vignettes, the time offsets of the segments and vignettes will be passed to the video transcoder tool (ffmpeg) so that more key frames can be inserted to improve video seek accuracy and latency. The server 200 can start by downloading the normalized form of the video assets. Each video can be normalized to the same frame rate and resolution so that the ffmpeg muxer can process them into a single video without strange artifacts caused by inconsistent video types. The resulting video is then inserted into the video transcoding pipeline with optional time offsets where needed for improved seek when jumping between vignettes and their parent segments. The transcoding may utilize region adaptive smoothing, fixed smoothing, or variable smoothing.

The resulting single interactive video file can be a streamable optimized package. The 360-degree video transcoder may use various smoothing techniques and HEVC h.265 standard encoding to produce a movie file as small as possible, and combine the individual videos all into one segmented video. The single interactive video file allows for a smaller package that can be downloaded and streamed using less bandwidth. In various embodiments, different encoding techniques may be used, such as, for example, x265.

At step 930, the server 200 can provide the single interactive video file to the video player. The video player can exist on the server 200, another server, UE 300, or another UE. The file can be uploaded to another device from the server 200, or accessed on the fly from the server 200. The single interactive video file, during playback, can display interactable aspects (e.g., hotspots) based on various user settings. The hotspots may be highlighted, overlaid, transparent, only showing up if an indicator passes over them, etc.

In one or more embodiments, when providing the single interactive video file to a video player, the server 200 may stream the file during a play back. When streaming, the server 200 may then use multiple video files or stream each video within the file separately.

The single interactive video file includes all the videos with various timestamps or other metadata indicators to indicate which section of the video to jump to when a hotspot or trigger occurs. Such videos may not be viewable without the trigger. This format allows for seamless switching. The seamless switching can be done in the interactive 360-degree video player that reads the metadata along with the video. Because the compiler and transcoder put all of the individual videos into a single interactive video file with short iframes (jump times in the video) even mobile phones can be allowed to jump or seek points in the video almost instantly.

Although FIG. 9 illustrates an example process for creating a 360-degree video, various changes could be made to FIG. 9. For example, while shown as a series of steps, various steps in each figure could overlap, occur in parallel, occur in a different order, or occur multiple times. Additionally, one or more steps can be optional. For example, when a video does not include a hotspot, steps 910 and 915 may be omitted. In another example, the file may not be provided to the video player and step 930 can be omitted.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. §112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for creating a single interactive video file, the method comprising:

receiving a selection of a plurality of 360-degree videos including a first 360-degree video and a second 360-degree video;

linking the first 360-degree video to the second 360-degree video to enable transitioning between the first 360-degree video and the second 360-degree video; and compiling the plurality of 360-degree videos into the single interactive file, wherein the single interactive video file includes an index used to identify the second 360-degree video within the single interactive video file when the link is executed.

2. The method of claim 1, wherein linking the first 360-degree video to the second 360-degree video further comprises:

receiving a selection of a portion of the first 360-degree video to form a hotspot; and receiving an identification of the second 360-degree video for linking through the hotspot.

3. The method of claim 2, wherein the hotspot, when triggered in the first 360-degree video, is configured in the single interactive video file to enable a video player to transition from the first 360-degree video to the second 360-degree video.

4. The method of claim 1, wherein compiling the plurality of 360-degree videos into the single interactive video file comprises:

providing, in the single interactive video file, an array of start and end time offsets representing locations along a timeline for each of the plurality of 360-degree videos.

5. The method of claim 1, wherein compiling the plurality of 360-degree videos into the single interactive video file comprises:

providing, in the single interactive video file, a list of links associated with hotspots and an index of the plurality of 360-degree videos to seek when each link is executed.

6. The method of claim 3, wherein the single interactive video file is configured to return to the first 360-degree video in which the hotspot is previously triggered, after the second 360-degree video is finished playing.

7. The method of claim 1, wherein the single interactive video file is configured to allow a video player to adjust a time of the first 360-degree video based on a duration of the second 360-degree video when returning to the first 360-degree video from the second 360-degree video.

8. The method of claim 1, wherein the single interactive video file is configured to allow a video player to start a timeline of the second 360-degree video only after transitioning to the second 360-degree video.

9. An apparatus for creating a single interactive video file, the apparatus comprising:

a memory element configured to store the single interactive video file; and at least one processor coupled to the memory element, the at least one processor configured to:

receive a selection of a plurality of 360-degree videos including a first 360-degree video and a second 360-degree video;

link the first 360-degree video to the second 360-degree video to enable transitioning between the first 360-degree video and the second 360-degree video; and compile the plurality of 360-degree videos into the single interactive file, wherein the single interactive video file includes an index used to identify the second 360-degree video within the single interactive video file when the link is executed.

10. The apparatus of claim 9, wherein the at least one processor is further configured to:

receive a selection of a portion of the first 360-degree video to form a hotspot; and receive an identification of the second 360-degree video for linking through the hotspot.

11. The apparatus of claim 10, wherein the hotspot, when triggered in the first 360-degree video, is configured in the single interactive video file to enable a video player to transition from the first 360-degree video to the second 360-degree video.

12. The apparatus of claim 9, wherein the at least one processor is further configured to:

provide, in the single interactive video file, an array of start and end time offsets representing locations along a timeline for each of the plurality of 360-degree videos.

13. The apparatus of claim 9, wherein the at least one processor is further configured to:

provide, in the single interactive video file, a list of links associated with hotspots and an index of the plurality of 360-degree videos to seek when each link is executed.

14. The apparatus of claim 11, wherein the single interactive video file is configured to return to the first 360-degree video in which the hotspot is previously triggered, after the second 360-degree video is finished playing.

15. The apparatus of claim 9, wherein the single interactive video file is configured to allow a video player to adjust a time of the first 360-degree video based on a duration of the second 360-degree video when returning to the first 360-degree video from the second 360-degree video.

16. The apparatus of claim 9, wherein the single interactive video file is configured to allow a video player to start a timeline of the second 360-degree video only after transitioning to the second 360-degree video.

17. A non-transitory computer-readable medium comprising instructions stored in a memory for creating a single interactive video file that, when executed by at least one processor, causes an electronic device to:

receive a selection of a plurality of 360-degree videos including a first 360-degree video and a second 360-degree video;

link between the first 360-degree video to the second 360-degree video to enable transitioning between the first 360-degree video and the second 360-degree video; and compile the plurality of 360-degree videos into the single interactive file, wherein the single interactive video file includes an index used to identify the second 360-degree video within the single interactive video file when the link is executed.

18. The non-transitory computer-readable medium of claim 17, further comprising instructions that, when executed by the at least one processor, causes the electronic device to:

receive a selection of a portion of the first 360-degree video to form a hotspot; and receive an identification of the second 360-degree video for linking through the hotspot.

19. The non-transitory computer-readable medium of claim 18, wherein the hotspot, when triggered in the first 360-degree video, is configured in the single interactive video file to enable a video player to transition from the first 360-degree video to the second 360-degree video.

20. The non-transitory computer-readable medium of claim 17, further comprising instructions that, when executed by the at least one processor, causes the electronic device to:

provide, in the single interactive video file, an array of start and end time offsets representing locations along a timeline for each of the plurality of 360-degree videos.

* * * * *